United States Patent [19]

Ibe

[11] Patent Number: 4,934,104
[45] Date of Patent: Jun. 19, 1990

[54] CONE TAIL CHUCK APPARATUS, AND A METHOD FOR USING THE SAME APPARATUS

[75] Inventor: Hiroyuki Ibe, Fukui, Japan

[73] Assignee: Shin-Etsu Handotai Company Limited, Tokyo, Japan

[21] Appl. No.: 409,352

[22] Filed: Sep. 19, 1989

[30] Foreign Application Priority Data

Sep. 26, 1988 [JP] Japan .................................. 63-238923

[51] Int. Cl.$^5$ ........................ B24B 5/02; B24B 5/313; B24B 41/06
[52] U.S. Cl. ..................................... 51/89; 51/217 R; 51/277; 269/233; 279/121; 29/558
[58] Field of Search ................. 51/338, 340, 342, 345, 51/346, 349, 355, 216 R, 283 R, 283 E, 277, 217 R, 80 R, 5 A, 89; 279/121; 29/558; 269/233

[56] References Cited

U.S. PATENT DOCUMENTS

| | | | |
|---|---|---|---|
| 2,398,906 | 4/1946 | McCain | 51/277 |
| 3,995,400 | 12/1976 | Gillette | 51/338 |
| 4,723,778 | 2/1988 | Kobayashi | 279/121 X |

Primary Examiner—Frederick R. Schmidt
Assistant Examiner—Bruce P. Watson
Attorney, Agent, or Firm—Lowe, Price, LeBlanc, Becker & Shur

[57] ABSTRACT

A cone tail chuck apparatus for chucking a conical body comprising: a plurality of abrasive stones arranged in a circle; a first drive device for causing the abrasive stones to spin; a second drive device for causing the abrasive stones to move centripetally (inwardly); and a frame,
which chuck apparatus is operated by:
(i) pressing the abrasive stones centripetally on the curved surface of the conical body;
(ii) operating the first drive device to cause the abrasive stones to spin;
(iii) operating the second drive device to cause the abrasive stones to move centripetally into the conical body; and
(iv) operating the first drive device to cause the abrasive stones to cease spinning when the abrasive stones has moved into the conical body by a predetermined distance.

6 Claims, 2 Drawing Sheets

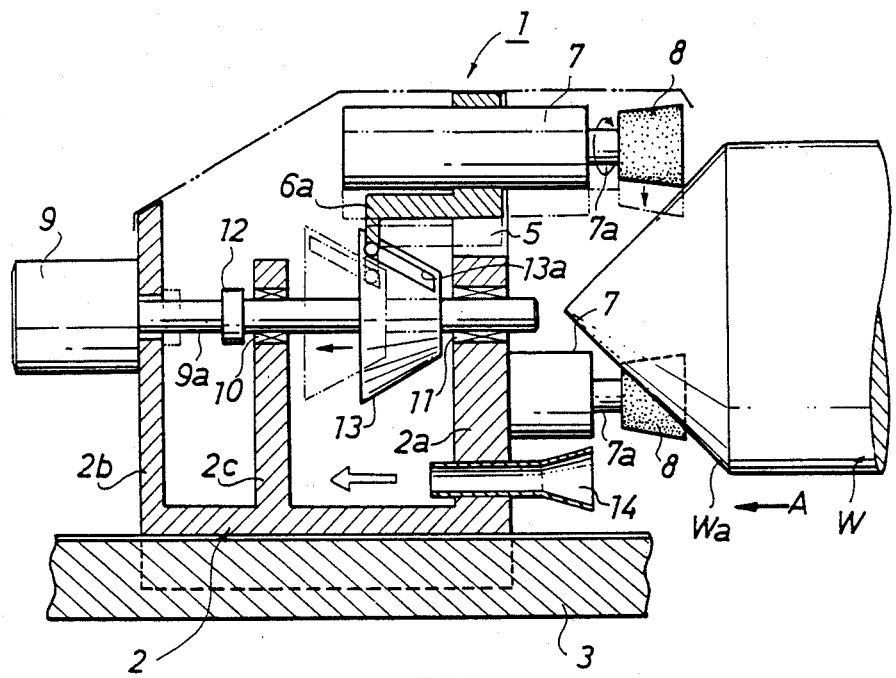
FIG. 1
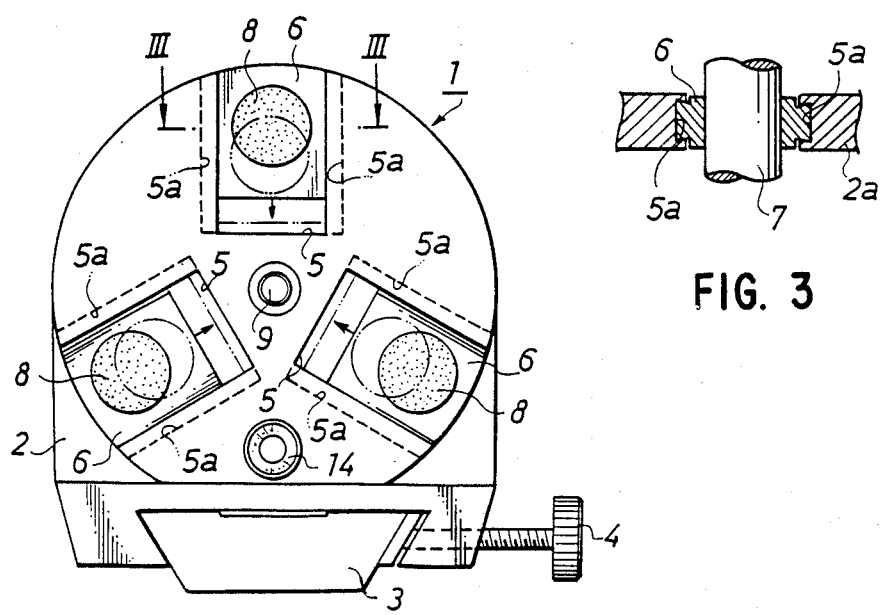
FIG. 2
FIG. 3

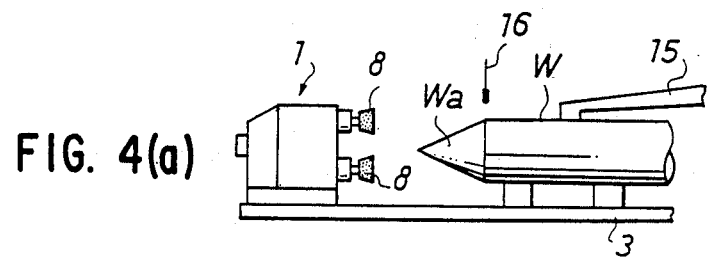
FIG. 4(a)
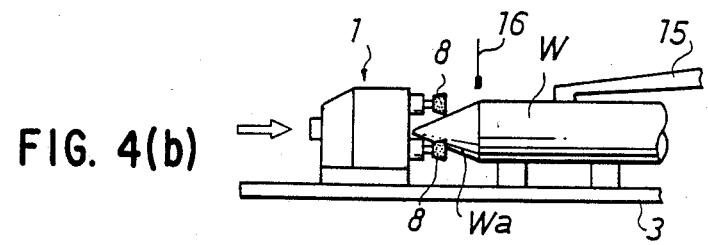
FIG. 4(b)
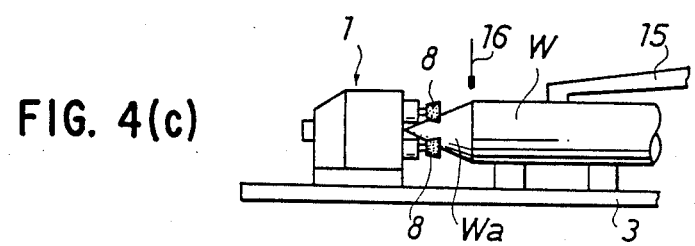
FIG. 4(c)
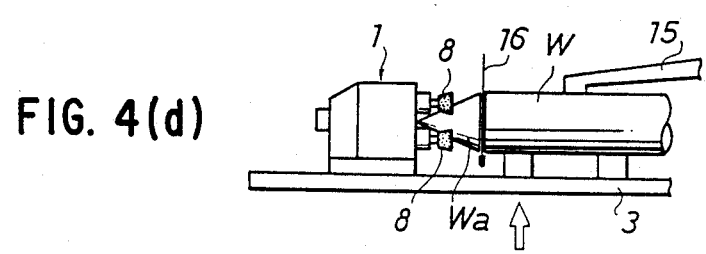
FIG. 4(d)
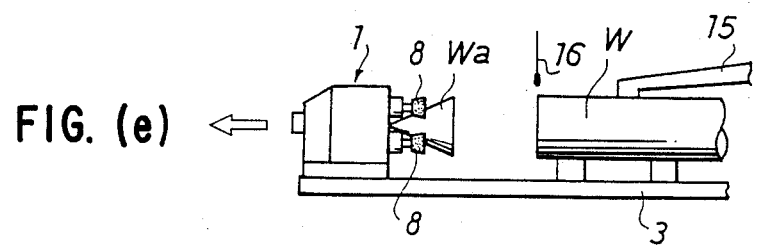
FIG. (e)

CONE TAIL CHUCK APPARATUS, AND A METHOD FOR USING THE SAME APPARATUS

BACKGROUND OF THE INVENTION

The present invention relates to a cone tail chuck device or apparatus for chucking a work having a conical tail portion or conical tail portions, and a method for using the same apparatus.

An example of such a work capable of being chucked by the cone tail chuck apparatus of the present invention is an unprocessed semiconductor monocrystal ingot which is obtained in the Czochralski method. The conical ends of the monocrystal ingot are severed from the main body of the ingot in such a manner that the remaining body of the ingot assumes a shape like a right cylinder, which is necessary since the subsequent grinding process requires the monocrystal ingot to be held squarely and firmly at its ends by an external cylindrical grinding machine.

To obtain high precision in the grinding operation, it is necessary to cut away the conical ends of the ingot such that the resulting cutting planes are parallel with each other and roughly normal to the center line of the ingot, and such that the cut faces and edges are free from nicks, which are often made as a result that at the last stage of severance the weight of the conical end portion works as bending stress on the skinny connection and the connection is eventually broken without waiting to be clearly cut through. To prevent the breakage it is necessary to supportively hold the conical end portion as well as the main body of the ingot while the severing operation proceeds. However, since the conical end portions of the ingot is tapered, and change their shapes irregularly from ingot to ingot, and also since the tapering surfaces of the end portions are slippery by nature, it was usually very difficult to mechanically fasten the end portions. Thus, to cut off the end portions of the ingots with high precision and without creating of nicks was very difficult.

SUMMARY OF THE INVENTION

The present invention, therefore, was contrived with the view of solving this problem, and in particular, the invention provides a cone tail chuck apparatus which is capable of fastening (chucking) a work having a conical portion, and thereby rendering it easy to externally grind the works with high precision.

It is also an object of the invention to provide a method for effectively operating the cone tail chuck apparatus of the invention.

In order to attain the above and other objects, the inventors contrived a cone tail chuck apparatus which comprises:
a plurality of abrasive means arranged in a circle;
a first drive means for causing the abrasive means to spin;
a second drive means for causing the abrasive means to move either inwardly or outwardly with respect to the imaginary circle they form; and
a frame means.

In a preferred embodiment of the invention,
the plurality of abrasive means are grind stones;
the first drive means are air motors each having a spin rod carrying the grind stone at the end;
the second drive means consists of an air cylinder and a drive mechanism, which latter comprises:
a main rod capable of freely reciprocating in the axial direction driven by the air cylinder;
a cam fixed about the main rod and having as many grooves as the number of grind stones, the grooves being equally slanted to the axis of the main rod;
couplers coupling the cam with the air motors, each coupler having an arm portion which is slidably engaged with the respective groove in the cam, and each coupler having a slider portion fixedly holding the respective air motor; and
the frame means comprises a frame with a front wall having hollow guides in it to guide the slider portions of the couplers in such a manner that each coupler is radially movable but axially immovable, and with a rear wall to which the air cylinder is attached, the both walls cooperatively bearing the slidable main rod.

More preferably, the abrasive means are tapered backwardly.

More preferably, the shape of the cam is truncated cone tapered forwardly.

Designed as described above, the apparatus according to the invention performs effectively to attain the object of the invention if it is operated in accordance with the following method comprising the steps of:

(i) clamping a work having a conical portion such that the center line of the conical portion of the work coincides with the center line of the main rod;

(ii) bringing the abrasive means centripetally toward the work until the abrasive means provided at the ends of the spin rods are pressed against the tapered surface of the conical portion of the work;

(iii) operating the air motor (first drive means) to cause the spin rods to spin about their axes;

(iv) operating the air cylinder to force the main rod to shift backward whereby the cam shifts backward to urge the axially immovable couplers to move radially toward the axis of the main rod to thereby let the respective abrasive means grind the tapered surface of the conical portion of the work and create recesses therein; and (v) operating the air motor to cause the spin rods to cease spinning, when it is detected that the main rod has retreated by a predetermined amount.

According to the apparatus and the method of the invention described above, the cone tail chuck apparatus by its abrasive means (grind stones) urged radially inwardly claws hold of the work at the recesses it has made in the tapered surface of the conical portion of the work so that the conical portion is firmly chucked by the cone tail chuck apparatus and the weight of the conical portion is always supported by the cone tail chuck apparatus, whereby it becomes possible to sever the conical end portions of the works in a manner that the resulting cutting plane is a circle roughly normal to the center line of the conical portion, and that the cut faces and edges are free from nicks.

Although the shape of the abrasive means to be fixed at the end of the spin rods can be arbitrary if it is backwardly tapered, it is preferred that the shape of the abrasive means is a truncated cone, and each abrasive means is fixed at the free end of each spin rod such that the center line of the truncated cone coincides with the axis of the spin rod with the truncated end face reversely facing the work to be clutched.

With this preferred arrangement, the chucking of the conical portion of the work will be firmer.

The invention will be better understood in view of a preferred mode thereof described with reference to the following figures.

BRIEF DESCRIPTION OF THE DRAWINGS

FIG. 1 is a longitudinal sectional view of a cone tail chuck apparatus of the invention with accessory elements and a work to be severed;

FIG. 2 is a view of the cone tail chuck apparatus of FIG. 1 seen in the direction indicated by an arrow A in FIG. 1;

FIG. 3 is a fragmentary cross section taken along the plane of line III—III of FIG. 2;

FIG. 4a shows the cone tail chuck apparatus and a work aligned to each other on a guide table;

FIG. 4b shows the cone tail chuck apparatus and a work when the grind stones are urged against the conical portion of the work;

FIG. 4c shows the cone tail chuck apparatus and a work when the grind stones are spinning and moving toward the axis of the conical portion of the work;

FIG. 4d shows the cone tail chuck apparatus and a work when they are raised on the guide table to be cut through; and FIG. 4e shows the cone tail chuck apparatus and a work when the cone tail chuck is moved away from the work to thereby disconnect the conical portion.

DETAILED DESCRIPTION OF THE INVENTION

Referring to the attached drawings, the invention shall be described further in detail based on its embodiment.

In a cone tail chuck apparatus, designated by a numeral reference 1 in FIGS. 1 and 2, a frame 2 is slidably mounted on a straight line guide table 3, which has an inverted isosceles trapezoid cross section. A shallow wide groove is made in the upper face of the horizontal guide table 3 and the frame 2 can slide smoothly on and along the guide bale 3. A clamper screw 4 is provided in a foot of the frame 2, and when sufficiently screwed in clamps the frame 2 to thereby render the cone tail chuck apparatus immovable on the guide table 3.

Three hollow guides 5 are made in a circular front wall 2a of the frame 2. The hollow guides 5 are generally rectangular in section, and arranged radially with the side walls and equiangularly around a main rod 9a, which horizontally penetrates the frame 2, penetrating the circular front wall 2a at the center thereof. Each guide 5 has a pair of parallel guider grooves 5a having a dovetail cross section cut in the front wall 2a. Each pair of the guider grooves 5a slidably engage with a pair of rails having the same dovetail cross section of a slider member 6, which is thereby received in the guide 5 (FIGS. 2 and 3). As the rails of the slider member 6 slides in the guider grooves 5a, the slider member 6 moves in the guide 5 as shown by two dot-chain lines in FIGS. 1 and 2.

Each slider member 6 carries an air motor 7 in a manner that the drive shaft 7a (spin rod) extends from the air motor 7 horizontally. A grind stone 8 having a shape of truncated cone is fixed at the free end of each drive shaft 7a, with the larger end face of the truncated cone facing forward (toward the conical body).

An air cylinder 9 is fixedly provided on the rear side of a back wall 2b of the frame 2. The rear end of the horizontal main rod 9a is received in the air cylinder 9. The main rod 9a is also borne by the front wall 2a and a middle wall 2c by means of lubricous bushes 11 and 10, respectively. A stopper 12 is fixedly provided about the main rod 9a at a suitable location between the middle wall 2c and the back wall 2b. A cam 13 is also locked about the main rod 9a at a suitable location between the front wall 2a and the middle wall 2c.

The cam 13, tapering toward the fore end thereof, has a shape of truncated cone. Three cam grooves 13a are provided in the curved surface of the cam 13. These cam grooves 13a are located equiangularly with respect to the axis of the main rod 9a so that each cam groove angularly corresponds to the respective slider member 6. An arm 6a shaped like a letter "L" extends integrally from each slide member 6, and has its end captured slidably in the corresponding cam groove 13a. The L-shaped arm 6a and the slider member 6 constitute a coupler for slidably coupling the cam 13 with the air motor 7.

The air motor 7 and the air cylinder 9 are pneumatically connected to a compressed air supply source not shown. Each air motor 7 drives the respective drive shaft 7a at high speeds, determined by the material of which the work W to be processed is made. The air cylinder 9 is adapted to reciprocate the main rod 9a.

The cam grooves 13a formed in the surface of the tapered cam 13 are so designed that, as the main rod 9a is caused to shift forward, the axially immovable slider members 6 are urged to move radially outwardly in the respective guides 5, and vice versa. It is therefore understood that the three drive shafts 7a (spin rods) are always in parallel with the main rod 9a, always equidistant from the main rod 9a, always equiangular with respect to the main rod 9a, and always having their front ends carrying the grind stones flush with each other in a plane normal to the axis of the main rod 9a.

In FIGS. 1 and 2, reference numeral 14 designates a hood provided in the lower part of the front wall 2a for collecting dust. The hood 14 has a bell mouth, opening forward, to suck in the dust. The other end of the hood 14 is connected to a dust bin with a suction pump not shown.

Next, how to chuck the work W by means of the cone tail chuck apparatus 1 according to the method of the present invention will be explained with reference to the figures.

As illustrated in FIG. 4a, the chuck apparatus 1 and the work W having a conical portion Wa are mounted on the guide table 3 apart from each other. At this moment it is ascertained that the main rod 9a is assuming the thrown-out position as it is in FIGS. 1 and 2. If it is not assuming the thrown-out position, the air cylinder 9 is operated to cause the main rod 9a to shift forward into the thrown-out position whereby the L-shaped arms 6a, the slider members 6, the air motors 7, the drive shafts 7a, and the grind stones 8 are altogether urged to move radially outwardly by virtue of the function of the cam 13 with its slider grooves 13a. It is also arranged that the front side of the chuck apparatus 1 faces the conical portion Wa of the work W, which is carefully fixed on a pair of slidable stand means such that the center line of the work W coincides with the center line of the main rod 9a of the chuck apparatus 1. A clamper 15 is utilized to keep the work W from moving along the guide table 3 on the slidable stand means.

Referring to FIG. 4b, the chuck apparatus 1 is transported toward the work W along the guide 3 until the grind stones 8 provided at the free ends of the drive shafts 7a are pressed against the conical portions Wa of the work W. Then the clamper screw 4 is screwed in till the frame 2 is clamped on the guide table 3.

Thereafter the air motor 7 is operated to cause the grind stones 8 to spin at a high speed whereby the grinding operation begins. At the same time the suction pump, not shown, for the dust collector 14 is started to collect the dust that falls from the conical portion Wa of the work W.

As the grinding operation proceeds, the air cylinder 9 is operated such that the main rod 9a is slowly drawn in the air cylinder 9 (FIG. 4c). As the main rod 9a together with the cam 13 is slowly shifted backward, the ends of the L-shaped arms slide in the respective slider grooves 13a toward the front side ends of the grooves 13a, whereby slider members 6 together with the air motors 7 slide radially inwardly in the hollow guides 5 (FIG. 2).

Eventually, when the main rod 9a is drawn by a certain amount from the thrown-out position, which amount is determined by the position of the stopper 12, the grind stones 8 as well as all the interlocked parts assume the new positions indicated by the two-dot chain lines in FIGS. 1 and 2. At this moment the supply of compressed air to the air motors 7 is ceased to thereby stop the spinning movement of the spin rod 7a and the grinding operation of the grind stones 8.

As a result of the radially inward movement of the grind stones 8, three equiangularly located recesses are made in the tapered surface of the conical portion Wa of the work W, one of the recesses being shown in FIG. 1. Since the grind stones 8 are truncated cone in shape with the larger end face facing the work W, the edges of the grind stones have a profile of an acute angle. Consequently the recesses made by the edges of the grind stones have a profile containing an acute angle (FIG. 1). By virtue of this fact, the grind stones 8 do not allow the work W to move in the axial direction. Therefore, however slippery the work W may be, the chuck apparatus 1 holds the conical portion Wa of the work W firmly and the weight of the conical portion Wa is always borne by the chuck apparatus 1.

When the chucking of the work W at its conical portion is thus completed, a cutter blade 16 is started to turn at a high speed, and the guide table 3 is raised at a constant rate (FIG. 4d). When the cutting operation is completed, the clamper screw 4 is loosened and the chuck apparatus 1 is transported backward (FIG. 4e) to carry the conical portion Wa away from the main body of the work W.

Since the conical portion Wa of the work W is always firmly held by the chuck apparatus 1 during the cutting operation, the conical portion Wa, even when it is mostly severed from the main body of the work W, does not quiver, and does not impose its weight on the thinning joint. Hence, it is possible to obtain a work having both ends cut with precision and without nicks. With these true cylindrical works it is possible to conduct the subsequent grinding operation with high efficiency and high precision.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cone tail chuck apparatus comprising:
   (i) a plurality of abrasive means arranged in an imaginary circle;
   (ii) a first drive means for causing the abrasive means to spin;
   (iii) a second drive means for causing the abrasive means to move either inwardly or outwardly keeping them in the plane of said imaginary circle the abrasive means form; and
   (iv) a frame means.

2. A cone tail chuck apparatus as claimed in claim 1, wherein:
   (i) said plurality of abrasive means are grind stones;
   (ii) said first drive means are motors each having a spin rod carrying said grind stone at the end;
   (iii) said second drive means consists of an air cylinder and a drive mechanism, which latter comprises:
      a main rod capable of freely reciprocating in the axial direction driven by the air cylinder;
      a cam fixed about the main rod and having as many grooves as the number of grind stones, the grooves being equally slanted to the axis of the main rod;
      couplers coupling the cam with the air motors, each coupler having an arm portion which is slidably engaged with the respective groove in the cam, and each coupler having a slider portion fixedly holding the respective air motor; and
   (iv) the frame means comprises a frame with a front wall having hollow guides in it to guide said slider portions of the couplers in such a manner that each coupler is radially movable but axially immovable, and with a rear wall to which the air cylinder is attached, the both walls cooperatively bearing the slidable main rod.

3. A cone tail chuck apparatus as claimed in claim 2, wherein the grind stones are tapered backwardly.

4. A cone tail chuck apparatus as claimed in claim 2, wherein the shape of the cam is a truncated cone tapered forwardly.

5. A method for chucking a conical portion of a work utilizing a cone tail chuck apparatus, which apparatus comprises:
   a plurality of abrasive means arranged in an imaginary circle;
   a first drive means for causing the abrasive means to spin;
   a second drive means for causing the abrasive means to move either inwardly or outwardly keeping them in the the plane of said imaginary circle the abrasive means form; and
   a frame means, said method comprising the steps of:
      (i) pressing said plurality of abrasive means on said conical portion of the work;
      (ii) operating said first drive means to cause said abrasive means to spin;
      (iii) operating said second drive means to cause said abrasive means to move inwardly keeping them in the plane of the imaginary circle said abrasive means form; and
      (iv) operating said first drive means to cause said abrasive means to cease spinning when said abrasive means has moved inwardly by a predetermined amount.

6. A method for chucking a conical portion of a work utilizing a cone tail chuck apparatus, which apparatus comprises:
   a plurality of grind stones;

as many air motors as said grind stones each having a spin rod carrying said grind stone at the end;

an air cylinder;

a main rod capable of freely reciprocating in the axial direction driven by said air cylinder;

a cam fixed about said main rod and having as many grooves as said grind stones, the grooves being equally slanted to the axis of the main rod;

couplers for coupling the cam with the air motors, each coupler having an arm portion which is slidably engaged with the respective groove in the cam, and each coupler having a slider portion fixedly holding the respective air motor; and a frame with a front wall having hollow guides in it to guide said slider portions of the couplers in such a manner that each coupler is radially movable but axially immovable, and with a rear wall to which said air cylinder is attached, the both walls cooperatively bearing said slidable main rod, said method comprising the steps of:

(i) clamping the work having a conical portion such that the center line of the conical portion of the work coincides with the center line of the main rod;

(ii) bringing the abrasive means centripetally toward the work until the abrasive means provided at the ends of the spin rods are pressed against the tapered surface of the conical portion of the work;

(iii) operating the air motor to cause the spin rods to spin about their axes;

(iv) operating the air cylinder to force the main rod to shift backward whereby the cam shifts backward to urge the axially immovable couplers to move radially toward the axis of the main rod to thereby let the respective abrasive means grind the tapered surface of the conical portion of the work and create recesses therein; and (v) operating the air motor to cause the spin rods to cease spinning, when it is detected that the main rod has retreated by a predetermined amount.

* * * * *